April 2, 1957     H. E. VAN VALKENBURG     2,787,160
ULTRASONIC LIQUID DEPTH INDICATOR
Filed June 29, 1953
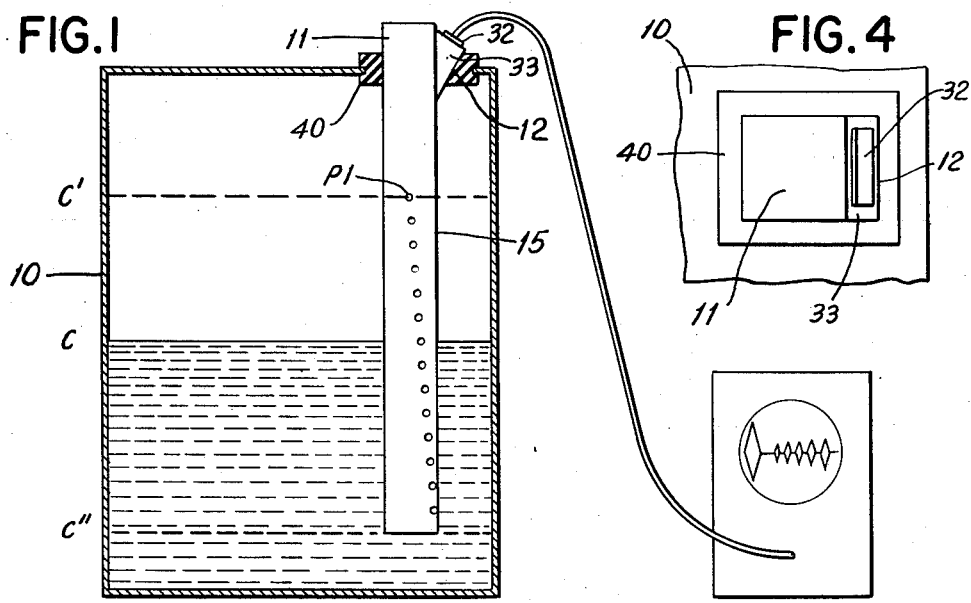
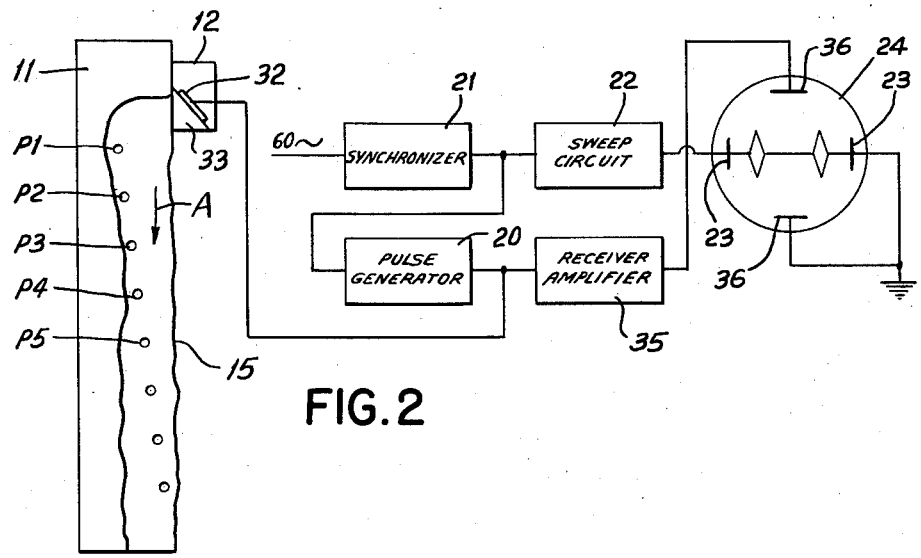
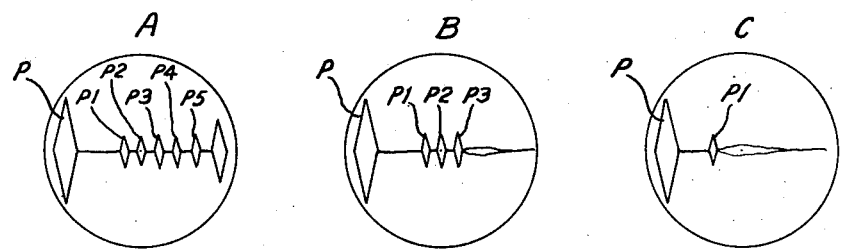

United States Patent Office 2,787,160
Patented Apr. 2, 1957

2,787,160

ULTRASONIC LIQUID DEPTH INDICATOR

Howard E. Van Valkenburg, Candlewood Isle, Conn., assignor to Sperry Products, Inc., Danbury, Conn., a corporation of New York Application June 29, 1953, Serial No. 364,680

1 Claim. (Cl. 73—290)

This invention relates to a device for indicating the depth of liquid in a tank or similar container by the use of ultrasonic wave trains. It has heretofore been proposed to utilize an ultrasonic echo method similar to depth sounding for the purpose of measuring depth of liquid in a container. However, the latter method involves placing an electro-acoustic transducer in the bottom of the tank and shooting a beam of ultrasonic vibrations toward the surface, or floating the transducer. From such an arrangement many problems result, including problems of installation, maintenance, fallacious signals due to bubbles, suspensions, swirling and stirring paddles, and also signal failure at a rough or foaming surface. It is therefore one of the principal objects of this invention to provide an ultrasonic liquid depth indicator which is free of the foregoing objections.

It is a further object of the invention to provide an ultrasonic liquid depth gauge which has no moving mechanical parts, can be electrically sealed, can be made noncorrosive, can be easily installed from the top of the tank or removed for maintenance, and which can be calibrated independent of the acoustic velocity in the liquid.

Further objects and advantages of this invention will become apparent in the following detailed description thereof.

In the accompanying drawings,

Fig. 1 is an assembly view, largely diagrammatic, illustrating one form of this invention.

Fig. 2 is a block wiring diagram showing the means for generating the surface wave trains in the measuring strip.

Figs. 3A, B, and C are diagrammatic representations of the oscilloscope screen showing various indications of liquid depth from minimum to maximum.

Fig. 4 is a plan view showing the method of mounting the strip on the tank.

Referring to Fig. 1 of the drawings, there is illustrated a liquid-holding tank 10 in which it is desired to obtain a continuous indication of liquid depth. The method here proposed is the utilization of a strip 11 which is mounted in a manner to be described hereinafter on the top of the tank and which extends downwardly to a point which is below the minimum level to be recorded. The strip 11 is of such material as to be a good conductor of ultrasonic vibrations and at the same time of such material as to be noncorrosive when in contact with the liquid in the tank or the atmosphere. At one side of said strip 11 adjacent the top thereof there is mounted an electro-acoustic transducer 12 adapted to be energized so as to generate surface wave trains. The characteristic of such wave trains is that they energize the surface of the strip to which the transducer is applied and for a depth not exceeding several wave lengths below the surface. They do not however extend to the opposite wall of the strip 11 so as to be reflected therefrom. The passage of the ultrasonic surface wave along the surface 15 of strip 11 and for a distance of several wave lengths below said surface is illustrated in Fig. 2. It has been shown that if a plurality of holes or perforations P1, P2, P3, etc., are formed at regular intervals along the length of the strip, said perforations being in a direction transverse to the direction of propagation of the surface wave as indicated by the arrow A, said holes or perforations will successively reflect the surface waves back to the point of origin and a succession of reflections will be received from the successive holes. The holes are preferably sealed to exclude the liquid.

The means for transmitting such surface wave trains and for indicating the reception of reflections thereof from the successive perforations is illustrated in Fig. 2. Here it will be seen that a pulse generator 20 may be energized periodically from a suitable source of alternating current such as sixty-cycle A. C. by way of a synchronizer 21 which will trip the pulse generator sixty times per second. Simultaneously with tripping the pulse generator 20, the synchronizer also energizes a sweep circuit 22 to generate a sweep between horizontal plates 23 of an oscilloscope 24. The pulses are applied to a piezo-electric crystal 32 mounted upon a wedge-shaped support 33 so that the pulses or wave trains are transmitted into the strip 11 by way of surface 15 at such angle as to exceed the critical angle for both longitudinal and shear waves, so that only surface waves remain. The surface waves travel down the strip, and as the wave train strikes each successive perforation it is reflected back to the transducer 32 to generate an EMF which is amplified by an amplifier 35 and applied to the vertical plates 36 of the oscilloscope to deflect the horizontal sweep and give a succession of indications P1, P2, P3, etc., corresponding to the perforations P1, P2, P3, etc. Since the generated pulse P is also applied to the amplifier 35 it will also appear as the initial indication on the oscilloscope screen.

The principle which enables this device to be employed for the measurement of liquid depth resides in the fact that the energy of a surface wave is confined to a narrow ribbon having a depth of only a few wave lengths and further that the maximum amplitude of the surface wave occurs at the free boundary of the material carrying the wave and is very substantially damped by liquid in contact with the surface. This means that if strip 11 is partly submerged in the liquid in the tank, the surface wave will be undamped down to the upper level of the liquid, whereupon it will be very substantially damped. Further, since the perforations are a fraction of a wave length below the surface, this means that the perforations P1, P2, P3, etc., down to the upper level of the liquid will reflect the undamped surface wave train, whereas the perforations which are submerged in the liquid will show relatively little reflection of surface wave energy since the greater part of this energy has been damped by the liquid. Therefore, referring to the graphs of the oscilloscope shown in Fig. 3, if the tank holds liquid below level C″, the oscilloscope screen will show a full set of perforations P1, P2, P3, etc., corresponding to the total number of perforations in strip 11 from top to bottom. If however the tank is filled to the level C, only the perforations down to level C will return full reflections P1, P2, P3, etc., down to level C where further reflections will be substantially damped out. In graph C there is shown the condition where the tank is filled to maximum level C′, and there it will be seen that only the perforation P1 is effective to return a reflection of the transmitted wave train. Obviously therefore the oscilloscope screen may be calibrated from right to left indicating minimum to maximum depth, depending upon the distance from the right to the first substantial reflection. The screen can be calibrated to whatever degree of accuracy is required for the specific application by the selection of the number and spacing of the perforations in the strip. The absolute accuracy is independent of the acoustic velocity in either the liquid or the strip as long as a finite number of calibrating holes is employed.

Instead of vertical deflections of the horizontal sweep, there may be employed the equivalent intensity modulated sweep to yield bright spots at positions P1, P2, P3, etc.

As stated hereinbefore, the energy in the surface wave is confined to a narrow ribbon having a depth of only a few wave lengths, and further the amplitude of the echo from a test hole is inversely proportional to its depth below the surface and distance from the search unit. Therefore, by arranging the holes in a step-like manner, placing the near holes further below the surface and the more distant holes progressively nearer the surface, signals of substantially constant magnitude will be obtained corresponding to reflections of the wave train throughout the length of the strip.

The strip 11 and transducer 12 may be mounted on the tank in such manner as to keep the electric connections to the transducer out of the tank. One method of accomplishing this result is illustrated in Fig. 4 wherein it will be seen that the strip 11 is insulated from the wall of tank 10 by electric insulating material 40 extending around three sides of the strip. The insulation cannot be applied to the surface 15 because this would prevent the surface wave trains from entering the strip. Therefore the wedge 33 which supports the crystal 32 may be made co-extensive with the width of surface 15 and be made of such material as to be electrically insulating while at the same time being a good transmitter of ultrasonic vibrations. Such wedge material may be known plastics such as teflon, nylon, pylon, or similar material.

Having described my invention, what I claim and desire to secure by Letters Patent is:

An ultrasonic depth indicator for indicating the depth of liquid in a tank, comprising a strip of acoustic conducting material adapted to be positioned within the tank and extending vertically through the range of depth to be measured, means adjacent one end of said strip for transmitting trains of ultrasonic surface waves along said strip toward the other end thereof and for receiving reflections of said trains, said strip having a plurality of areas at intervals along its length adapted to intercept said wave trains and reflect them back toward the point of transmission, said ultrasonic vibrations being substantially damped where the liquid engages the strip, and means connected to said transmitting and receiving means for indicating the reflections from said reflecting areas, the reflecting areas consisting of a plurality of holes extending through the strip in a direction transverse to the direction of transmission of the surface waves, the holes being arranged at regular intervals along the length of said strip, said wave trains being transmitted along one surface of said strip, and said holes being arranged at distances from said surface in inverse ratio to the distances of said holes from the point of transmission.

References Cited in the file of this patent
UNITED STATES PATENTS

| | | |
|---|---|---|
| 2,439,130 | Firestone | Apr. 6, 1948 |
| 2,472,249 | De Giers et al. | June 7, 1949 |
| 2,536,128 | Firestone et al. | Jan. 2, 1951 |
| 2,602,102 | Webb | July 1, 1952 |
| 2,709,918 | Yetter | June 7, 1955 |
| 2,713,263 | Turner | July 19, 1955 |

OTHER REFERENCES

Page 41 of Book: Ultrasonics by Carlin, pub. 1949 by McGraw-Hill Book Co. (A copy is in Div. 36.)